United States Patent
Chang

(10) Patent No.: US 7,889,915 B2
(45) Date of Patent: Feb. 15, 2011

(54) IMAGE PROCESSING DEVICE AND METHOD THEREOF

(75) Inventor: ChiHung Chang, Taipei (TW)

(73) Assignee: Lite-On Technology Corp., Taipei (TW)

( * ) Notice: Subject to any disclaimer, the term of this patent is extended or adjusted under 35 U.S.C. 154(b) by 951 days.

(21) Appl. No.: 11/746,585

(22) Filed: May 9, 2007

(65) Prior Publication Data

US 2007/0297697 A1 Dec. 27, 2007

(30) Foreign Application Priority Data

Jun. 27, 2006 (TW) .............................. 95123225 A

(51) Int. Cl.
*G06K 9/00* (2006.01)
(52) U.S. Cl. .................................... 382/162
(58) Field of Classification Search ................ 382/162, 382/166, 232, 240, 243, 245, 252, 302; 348/234, 348/425.3, 426.1, 432.1, 441, 467, 469, 488; 345/581, 603–604, 546
See application file for complete search history.

(56) References Cited

U.S. PATENT DOCUMENTS

| 6,249,545 | B1 * | 6/2001 | Iga .......................... 375/240.01 |
| 7,068,285 | B2 * | 6/2006 | Lee ............................ 345/605 |
| 7,120,297 | B2 * | 10/2006 | Simard et al. ............... 382/166 |
| 7,376,266 | B2 * | 5/2008 | Simard et al. ............... 382/166 |

* cited by examiner

*Primary Examiner*—Jose L Couso

(57) ABSTRACT

An image processing device is provided. The image processing device includes an image capturing device, a memory device and a microprocessor. The image capturing device captures a first image having plural first pixels. The memory device has a memory space with a size greater than a size of the first image and stores the first image therein. The microprocessor transforms a format of the first image stored in the memory device. The memory device stores the plural first pixels via a first sequence, and the microprocessor transforms the plural first pixels via a second sequence opposite to the first sequence.

18 Claims, 3 Drawing Sheets

3A

3B

3C

3D

IMAGE PROCESSING DEVICE AND METHOD THEREOF

FIELD OF THE INVENTION

The present invention relates to a memory device and a managing method, and more particular to a memory device and a managing method for reducing the consumption of memories in image processing.

BACKGROUND OF THE INVENTION

Due to the developing and designing of the image processing program, lots of memories are needed for operation in the image processing. Therefore, a good memory managing method can not only increase the performance and the stability of the system, but also decrease the requirement of memories.

Besides, in the consideration of the cost, it is very important to use memories efficiently. Particularly in the embedded system, memories are limited. When processing the image, the requirement of memories is necessary. Owing to the increasing of the image size, the requirement of memories will be increased accordingly. Therefore, a good memory managing method can raise the stability of the software operation and save the power. Considering the whole power budget, the system stability, the appropriate power distribution, etc., the cost will be reduced with the miniaturization of memories.

Take the camera program for the conventional Smartphone for example. Please refer to FIG. 1, which is a flow chart of a conventional memory managing method. As shown in step 1, the method provides a memory of 16 bits (2 bytes) to each pixel at the initiation. Then, a high-color image of 16 bits is captured by a camera and shown in a monitor. It means that when an image of W×H pixels is temporally stored, a memory of W×H×2 bytes is needed (step 2). During the image access, the 16-bit high-color image needs to be transformed into a 24-bit true-color image which needs a memory of W×H×3 bytes. Moreover, the image is continuous. Therefore, when the 16-bit high-color image are transformed into the 24-bit true-color image, an additional memory of W×H×3 bytes needs to be provided. In other words, the system totally needs a memory of W×H×5 bytes for transforming (step 3). Hence, when the image size is too large, the lack of memories will occur easily. The solutions of the conventional techniques for such problem are to either limit the image size to be input or add more memories.

In order to overcome the drawbacks in the prior art, an improved image processing device and the method thereof are provided. The particular design in the present invention not only solves the problems described above, but also is easy to be implemented. Thus, the invention has the utility for the industry.

SUMMARY OF THE INVENTION

In accordance with an aspect of the present invention, an image processing device is provided. The image processing device includes an image capturing device, a memory device and a microprocessor. The image capturing device captures a first image having plural first pixels. The memory device has a memory space with a size greater than a size of the first image and stores the first image therein. The microprocessor transforms a format of the first image stored in the memory device. The memory device stores the plural first pixels via a first sequence, and the microprocessor transforms the plural first pixels via a second sequence opposite to the first sequence.

According to the image processing device described above, the image capturing device is a camera.

According to the image processing device described above, the first image is a high color image and each of the plural first pixels is a 16-bit pixel, and the microprocessor transforms the high color image into a true color image comprising a plurality of second pixels each being a 24-bit pixel.

According to the image processing device described above, the microprocessor also transforms the true color image back to the high color image.

According to the image processing device described above, the plural first pixels are transformed into the plurality of second pixels and fill-full the memory device according to the second sequence.

According to the image processing device described above, the plural first pixels are written into the memory device according to the first sequence and the rest memory space of the memory device is filled with a signal "0".

In accordance with another aspect of the present invention, an image processing method is provided. The method includes steps of capturing a first image comprising plural first pixels, writing the first image into a memory space of a memory device via a first sequence, and transforming the first image stored in the memory device into a second image having plural second pixels, wherein the memory space has a size greater than a size of the first image, and the first image is transformed into the second image via a second sequence opposite to the first sequence.

According to the image processing method described above, the image capturing is performed by a camera.

According to the image processing method described above, the transforming is performed by a microprocessor.

According to the image processing method described above, a remaining memory space of the memory device in the writing step is filled with a signal "0".

In accordance with a further aspect of the present invention, an image transforming method is provided. The method includes steps of providing a first image comprising plural m-bit pixels, providing a memory device comprising a memory space having a size with n/m times a size of the first image, writing the first image into the memory space via a first sequence, and transforming the first image into a second image having plural n-bit pixels via a second sequence opposite to the first sequence and filling the memory space, wherein the n is a positive integer greater than the m.

According to the image transforming method described above, the first image is a high color image and the m is sixteen.

According to the image transforming method described above, the second image is a true color image and the n is twenty-four.

According to the image transforming method described above, the transforming is performed by a microprocessor.

According to the image transforming method described above, a remaining memory space of the memory device in the writing step is filled with a signal "0".

In accordance with another aspect of the present invention, an image transforming method is provided. The method includes steps of providing a first image comprising plural n-bit pixels, providing a memory device comprising a memory space having a size equal to that of the plural n-bit pixels, transforming the first image into a second image having plural m-bit pixels via a first sequence, modifying the second image to form a third image having plural m-bit pixels, and transforming the third image into a fourth image having plural n-bit pixels via a second sequence opposite to the first sequence and filling the memory space, wherein the n is a positive integer greater than the m.

According to the image transforming method described above, the first and the fourth images are true color images and the n is twenty-four.

According to the image transforming method described above, the second and the third images are high color images and the m is sixteen.

According to the image transforming method described above, a remaining memory space of the memory device in the transforming step is filled with a signal "0".

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
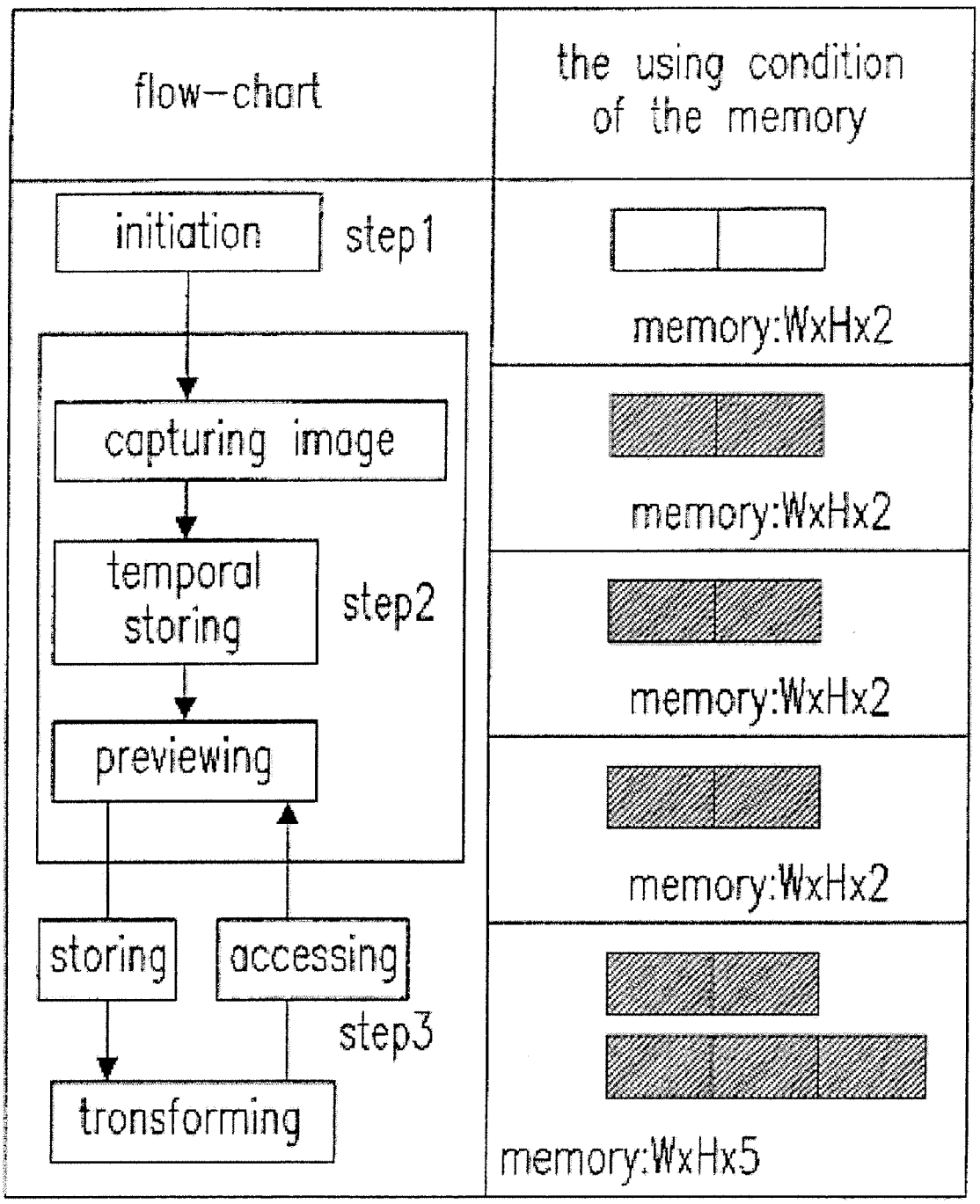
FIG. 1 is a flow chart of the conventional memory device and the managing method thereof.
Figure 2:
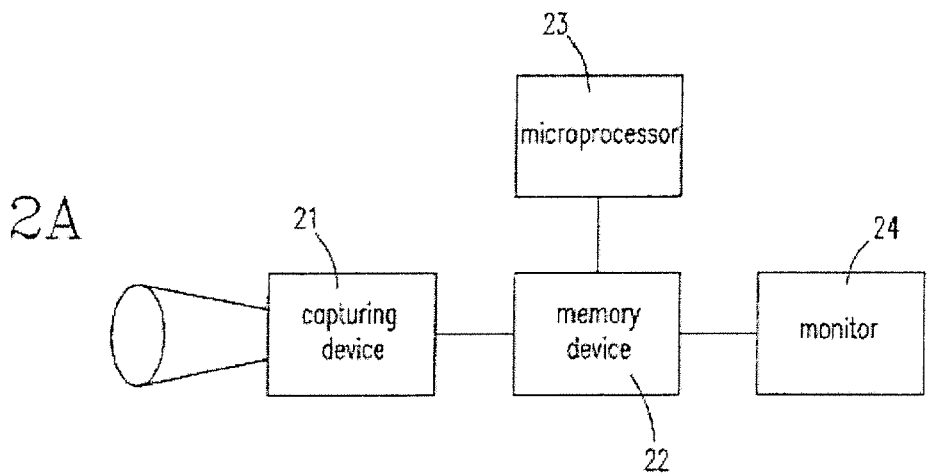
FIG. 2 is a schematic view of the first preferred embodiment of the present invention.
Figure 2:
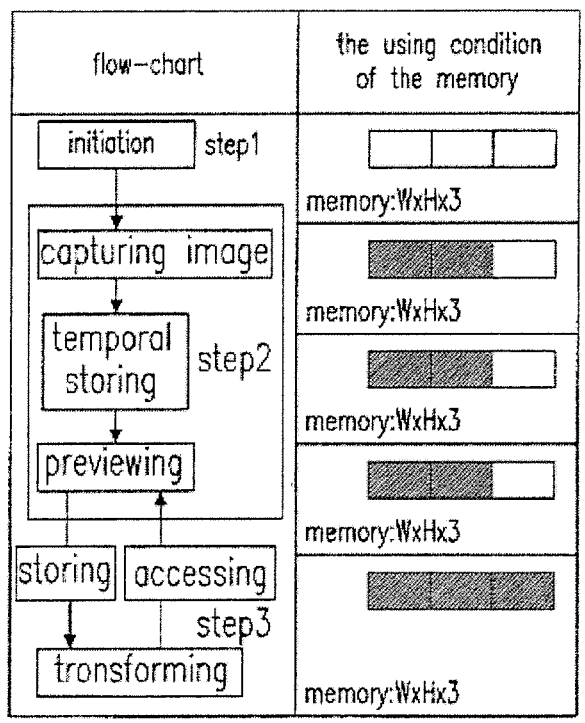
Figure 2:
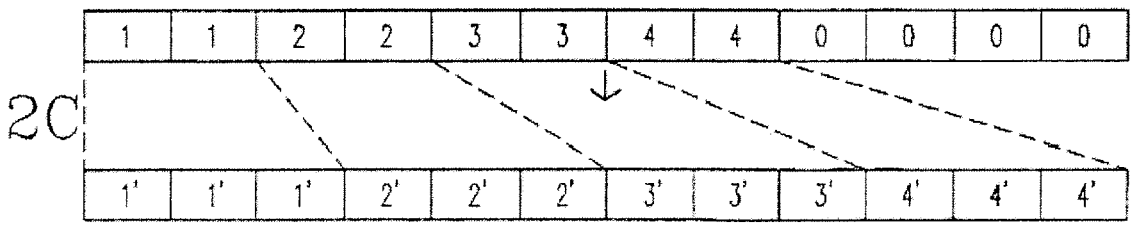

Please refer to FIG. 2, wherein 2A shows a schematic view of the first preferred embodiment of the present invention, 2B shows the flow chart of the first preferred embodiment of the present invention, and 2C shows a schematic view of how the memory is used. As shown in 2A, the image processing device includes a capturing device 21, a memory device 22, a microprocessor 23, and a monitor 24. In the step 1, when the image processing method is initiated, the memory device 22 is provided which defines a space with a size 1.5-fold to a 16-bit image datum. Then, in the step 2, a high-color image is captured and inputted through the capturing device 21 and temporally stored in the memory device 22 for being processed. The high-color image includes a plurality of pixels with a size of 16 bits. Simultaneously, the 16-bit high-color image is shown on the monitor 24 for previewing. The 16-bit high-color image is stored in the memory device 22 and the remaining memory space thereof is filled with a signal "0", as shown at the top portion of 2C. In the step 3, the 16-bit high-color image is transformed into a 24 bits true-color image, which is then stored in the memory device 22. The transforming process is performed via a serial sequence and the memory device 22 is filled with the 24-bit true-color image, as shown in 2C.

Figure 3:
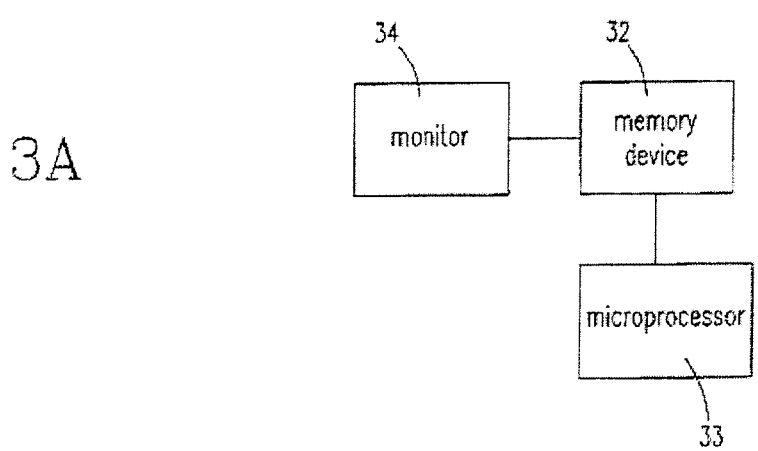
FIG. 3 is a schematic view of the second preferred embodiment of the present invention.
Figure 3:
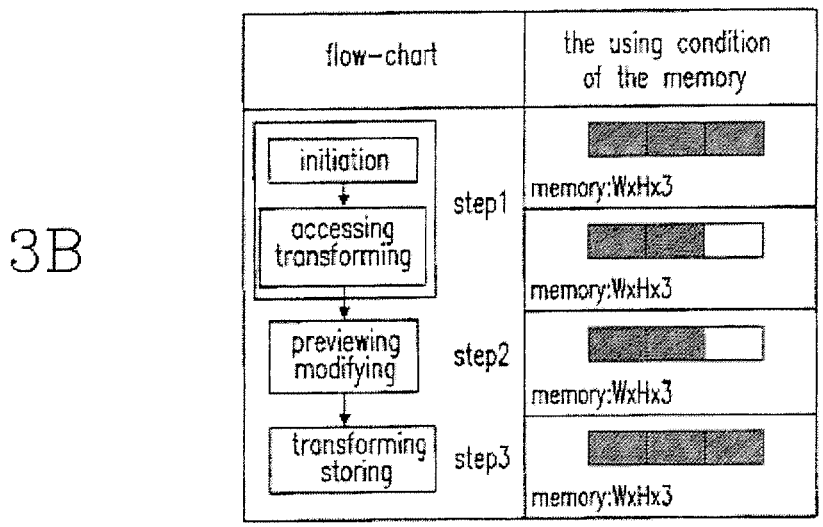
Figure 3:
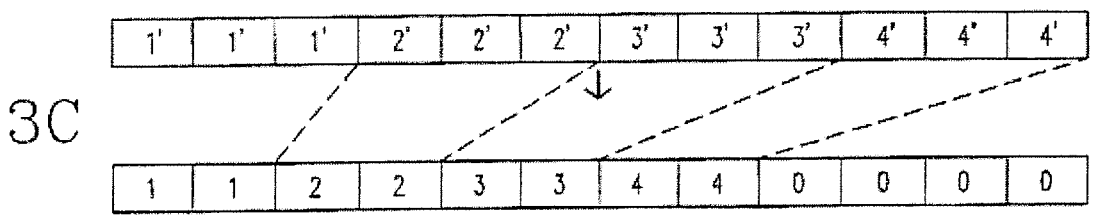
Figure 3:
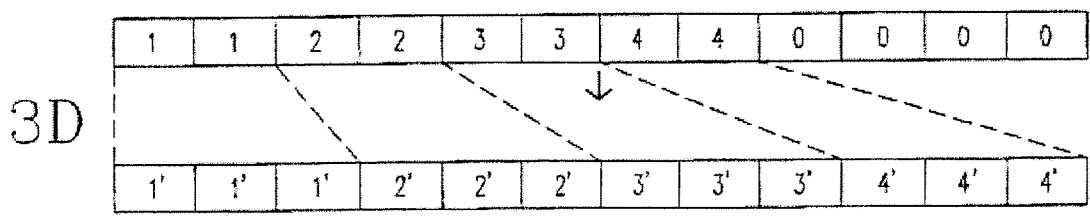

Please refer to FIG. 3, wherein 3A shows a schematic view of the second preferred embodiment of the present invention, 3B shows the flow chart of the second preferred embodiment of the present invention, and 3C-3D show the schematic views of how the memory is used. As shown in 3A, the image processing device includes a memory device 32, a microprocessor 33, and a monitor 34.

In the step 1, when a first 24-bit true-color image stored in the memory device 32 is accessed, it has to be transformed into a 16-bit high-color image by the microprocessor 33. Then, the 16-bit high-color image will be temporally stored in the memory device 32 and shown on the monitor 34 for previewing. The transforming process is performed via a first serial sequence and the remaining memory space of the memory device 32 is filled with a signal "0", as shown in 3C.

In the step 2, while the 16-bit high-color image is shown on the monitor 34, it also can be modified or decorated by the microprocessor 33. After the modification or decoration, a modified or decorated 16-bit high-color image is generated and temporally stored in the memory device 32. The modified or decorated 16-bit high-color image is also shown on the monitor 34.

At last in the step 3, the modified or decorated 16-bit high-color image is transformed into a second 24-bit true-color image by the microprocessor 33, meanwhile, the second 24-bit true-color image is stored in the memory device 34. The transforming process is performed as that the signal "0" is removed, and the modified or decorated 16-bit high-color image is transformed into the second 24-bit true-color image and filled into the memory spaces of the memory device 32 bit by bit via a second serial sequence, from the empty end to the other end, which is opposite to the first serial sequence. Finally, the memory device 32 is filled up with the second 24-bit true-color image, as shown in 3D.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image processing device, comprising:
    an image capturing device capturing a high color image having plural first pixels;
    a memory device having a memory space with 1.5 times greater than a first image in size and storing the first image therein; and
    a microprocessor transforming a format of the high color image into a true color image comprising plural of second pixels and storing the true color image in the memory device, and also transforming the true color image into the high color image,
    wherein each of the plural first pixels is a 16-bit pixel, each of the plural second pixels is a 24-bit pixel, the memory device stores the plural first pixels via a first sequence, and the microprocessor transforms the plural first pixels via a second sequence opposite to the first sequence.

2. The image processing device as claim 1, wherein the image capturing device is a camera.

3. The image processing device as claim 1, wherein the plural first pixels are transformed into the plurality of second pixels and fill-full the memory device according to the second sequence.

4. The image processing device as claim 1, wherein the plural first pixels are written into the memory device according to the first sequence and the rest memory space of the memory device is filled with a signal "0".

5. An image processing method, comprising steps of:
a. capturing a first image comprising plural first pixels by an image capturing device;
b. writing the first image into a memory space of a memory device via a first sequence, wherein the memory space has a size greater than a size of the first image; and
c. transforming the first image stored in the memory device into a second image having plural second pixels,
wherein the first image is transformed into the second image via a second sequence opposite to the first sequence.

6. The image processing method as claim 5, wherein the image capturing device is a camera.

7. The image processing method as claim 5, wherein the step c is performed by a microprocessor.

8. The image data processing method as claim 5, wherein a remaining memory space of the memory device in step b is filled with a signal "0".

9. An image transforming method, comprising steps of:
a. providing a first image comprising plural m-bit pixels;
b. providing a memory device comprising a memory space having a size with n/m times a size of the first image, wherein the n is a positive integer greater than the m;
c. writing the first image into the memory space via a first sequence by a processor; and
d. transforming the first image into a second image having plural n-bit pixels via a second sequence opposite to the first sequence and filling the memory space by the processor.

10. The image transforming method as claim 9, wherein the first image is a high color image and the m is sixteen.

11. The image transforming method as claim 9, wherein the second image is a true color image and the n is twenty-four.

12. The image transforming method as claim 9, wherein the processor is a microprocessor.

13. The image transforming method as claim 9, wherein a remaining memory space of the memory device in step c is filled with a signal "0".

14. An image transforming method, comprising steps of:
a. providing a first image comprising plural n-bit pixels;
b. providing a memory device comprising a memory space having a size equal to that of the plural n-bit pixels;
c. transforming the first image into a second image having plural m-bit pixels via a first sequence by a processor;
d. modifying the second image to form a third image having plural m-bit pixels; and
e. transforming the third image into a fourth image having plural n-bit pixels via a second sequence opposite to the first sequence and filling the memory space by the processor,
wherein the n is a positive integer greater than the m.

15. The image transforming method as claim 14, wherein the first and the fourth images are true color images and the n is twenty-four.

16. The image transforming method as claim 14, wherein the second and the third images are high color images and the m is sixteen.

17. The image transforming method as claim 14, wherein a remaining memory space of the memory device in step c is filled with a signal "0".

18. An image processing device, comprising:
a memory device comprising a plurality of memory spaces, each of which has a plurality of memory locations consisting of a first group of memory locations and a second group of memory locations;
an image capturing device for capturing an image, for generating high color image data including a plurality of n-bit pixels corresponding to the captured image, and for storing each of the plurality of n-bit pixels of the high color image data only in the first group of memory locations of the respective memory space; and
a microprocessor for transforming the high color image data into true color image data including a plurality of m-bit pixels corresponding to the captured image, and for storing the true color image data in the memory device such that a respective bit of one of the plurality of m-bit pixels is written into a respective one of the first and the second groups of memory locations in a sequence that a respective one of the first group of the memory locations will be written only when the second group of the memory locations have been fully written, wherein a size of each of the memory spaces is fixed such that each of the plurality of m-bit pixels entirely fills the first and second groups of memory locations of the respective memory space.

* * * * *